(12) United States Patent
Klemm et al.

(10) Patent No.: US 11,388,131 B2
(45) Date of Patent: Jul. 12, 2022

(54) SYSTEM AND METHOD FOR ASSESSING THE SENSITIVITY OF SOCIAL NETWORK USER POPULATIONS TO RESPONSE TIME DELAYS

(71) Applicant: Avaya Inc., Santa Clara, CA (US)

(72) Inventors: Reinhard Klemm, Basking Ridge, NJ (US); Valentine Matula, Granview, OH (US)

(73) Assignee: Avaya Inc., Santa Clara, CA (US)

( * ) Notice: Subject to any disclaimer, the term of this patent is extended or adjusted under 35 U.S.C. 154(b) by 435 days.

(21) Appl. No.: 14/586,691

(22) Filed: Dec. 30, 2014

(65) Prior Publication Data

US 2017/0085515 A1   Mar. 23, 2017

(51) Int. Cl.

| | |
|---|---|
| H04L 12/58 | (2006.01) |
| G06Q 30/02 | (2012.01) |
| G06N 5/04 | (2006.01) |
| G06F 15/16 | (2006.01) |
| H04L 51/52 | (2022.01) |
| H04L 43/00 | (2022.01) |
| H04L 51/046 | (2022.01) |
| H04L 67/50 | (2022.01) |

(52) U.S. Cl.
CPC .............. *H04L 51/32* (2013.01); *H04L 43/00* (2013.01); *H04L 51/046* (2013.01); *H04L 67/22* (2013.01)

(58) Field of Classification Search
CPC ......... H04L 51/32; H04L 67/10; H04L 67/24; H04L 12/2486; H04L 41/5064; H04M 3/51

USPC ........................................................ 709/206
See application file for complete search history.

(56) References Cited

U.S. PATENT DOCUMENTS

| | | | |
|---|---|---|---|
| 9,166,943 B2 * | 10/2015 | Hamilton, II | H04L 65/403 |
| 9,294,430 B2 * | 3/2016 | Knight | H04M 3/4872 |
| 9,355,425 B2 * | 5/2016 | Gargi | G06Q 50/01 |
| 9,363,223 B2 * | 6/2016 | Arquette | G06N 5/048 |
| 9,373,146 B2 * | 6/2016 | Yan | G06Q 50/01 |
| 9,396,480 B2 * | 7/2016 | Gupta | H04N 21/252 |
| 9,451,085 B2 * | 9/2016 | Skiba | H04M 3/5175 |
| 9,596,206 B2 * | 3/2017 | Bueno | H04L 51/32 |
| 2007/0168696 A1 * | 7/2007 | Ridel | G06F 11/3495 |
| | | | 714/E11.202 |
| 2012/0042013 A1 * | 2/2012 | Roman | G06Q 10/101 |
| | | | 709/204 |

(Continued)

Primary Examiner — Jason D Recek
Assistant Examiner — Golam Mahmud

(57) ABSTRACT

A contact center is operated by reference to response time statistics and social media analytics. A method for identifying a user population's sensitivity to response time delay comprises monitoring social network messaging activity to identify user messages associated with the user population. In some embodiments, the activity relates to at least one of an entity or a product or service associated with the entity. The user population may be selected on the basis of a socio-demographic characteristic or on the basis of observable social networking behavior and/or sentiment over a prior selection phase. The method further includes selecting a loyalty transition boundary identified by detecting a difference in aggregate sentiment between a first group of users receiving a response delayed by a first time period and a second group of users receiving a response delayed by a second time period greater than the first time period.

26 Claims, 7 Drawing Sheets

(56) References Cited

U.S. PATENT DOCUMENTS

| | | | |
|---|---|---|---|
| 2013/0185368 A1* | 7/2013 | Nordstrom | H04L 69/329 709/206 |
| 2013/0325667 A1* | 12/2013 | Satyavolu | G06Q 30/0629 705/26.64 |
| 2014/0089400 A1* | 3/2014 | Yan | G06Q 30/0269 709/204 |

* cited by examiner

700
| Socialmedia userProfile | |
|---|---|
| 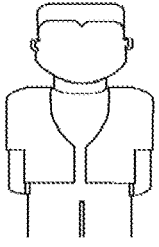 | 1. Name: John<br>2. Gender: Male<br>3. Current time:11:45, June 10<br>4. Endpoint address:9088467558<br>5. CurrentLocation:Ridge Road,New York, United States<br>6. Language/Country: English/United States<br>7. Birthday:October 19, 1981 |
| Social Network Channel(s) | Company FACEBOOK Page, TWITTER Feed |
| Delay Group | $N_2$ (4 hours) |
| Population Group | $G_3$ |
| | |
| Sentiment History | 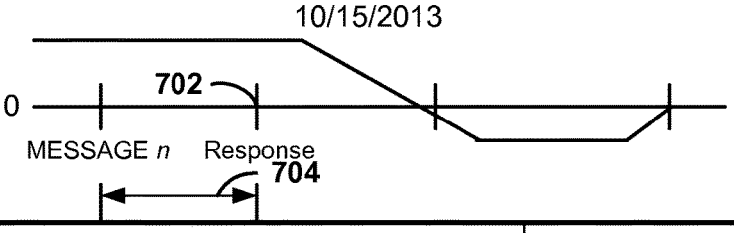 |
FIG 7

SYSTEM AND METHOD FOR ASSESSING THE SENSITIVITY OF SOCIAL NETWORK USER POPULATIONS TO RESPONSE TIME DELAYS

BACKGROUND OF THE INVENTION

Field of the Invention

Embodiments of the present invention generally relate to customer relationship management and, more particularly, to systems and methods for managing the timing and/or conduct of interactions between contact center agents and customers or potential customers of an entity.

Description of the Related Art

It is now commonplace for businesses and other entities to have a presence on public social networks, each a "social network channel". These channels may take the form, for example, of a Facebook page or a Twitter feed. Increasingly, customers and prospective customers are using social network channels to post status inquiries, to make complaints, and to request information about a product or service. Each of these customers or prospective customers has an expectation that he or she will receive a prompt response from the entity sponsoring the social network channel.

Presently available solutions are at best a "guess" by the owner or sponsor of a social network channel based on "rules of thumb" or personal experience. Specifically, the owner or sponsor of the social network channel is seeking an acceptable trade-off between a target level of customer satisfaction and the amount of resources which must be allocated to reach that target. To the extent a conservative approach to staffing is adopted (aimed at minimizing response times), a business may invest more capital—on attracting, training and retaining staff for responding to customer posts in social network channels—than might actually be required. Conversely, if inadequate resources are allocated for the purpose (resulting in long response times), then customers may easily become disaffected or dissatisfied.

A need therefore exists for systems and techniques enabling customer relationship managers and/or the agents of a contact center to base the allocation of resources—to the task of responding to inquiries, complaints and/or information requests received over one or more social network channels—on objective criteria.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods are described for assessing the sensitivity of different social network user populations to response time delays and, in some embodiments, for configuring response times in a contact center, or other system for responding to customers via social network channel(s), based on such assessment.

In an embodiment, a computer implemented method for determining sensitivity of a user population to response time delays comprises monitoring social network messaging activity of the user population to identify user messages created by members of the user population; subdividing the user population into N groups, where N is an integer greater than one; scheduling respective responses to corresponding identified user messages of the user population according to group, wherein responses to user messages of any group are delayed by a time delay different than those of each of the other groups; and determining if a loyalty transition boundary exists between any two groups of users.

In another embodiment, a computer implemented method for assessing response time sensitivity in a user population comprises monitoring social network messaging activity to identify user messages relating to at least one of an entity or a product or service associated with the entity, and scheduling a response to each message of a first group of identified user messages, to occur after expiration of a first time delay, at a contact center. The method further comprises scheduling a response to each message of a second group of identified user messages, to occur after expiration of a second time delay greater than the first time delay, at the contact center, determining if a loyalty transition boundary exists between groups of users receiving responses between expiration of the first and second time delays, respectively, and if a loyalty transition boundary is not determined to exist, iteratively scheduling responses to messages of at least one additional group of identified user messages, to occur after expiration of a time delay incrementally greater than a preceding time delay until at least one loyalty transition boundary is detected.

According to yet another embodiment, a method comprises monitoring social network messaging activity to identify user messages relating to at least one of an entity or a product or service associated with the entity, and selecting a loyalty transition boundary. In an embodiment, the loyalty transition boundary is identified by detecting a difference in aggregate sentiment between a first group of users receiving a response delayed by a first time period and a second group of users receiving a response delayed by a second time period greater than the first time period.

In yet another embodiment, a system for managing responses to inquiries and/or comments received over a social network channel comprises a contact center comprising at least one processor, memory, and a network interface, wherein the contact center is configured to monitor at least one social network channel for messages from a user population and relating to at least one of an entity or a product or service of the entity, and wherein the contact center is further configured to forward at least some messages to respective communication terminals for corresponding agents to respond to the at least some messages; and a response time selection module comprising instructions, stored in the memory and executable by the at least one processor, for selecting a loyalty transition boundary identified by detecting a difference in aggregate sentiment between groups of users receiving a response delayed by a respectively different period.

BRIEF DESCRIPTION OF THE DRAWINGS

FIG. 7 is a screen view depicting an illustrative profile of a user from whom a complaint, inquiry or request has been received via one or more social network channel(s) and for whom one or more responses have been scheduled and/or posted to the social network channel(s) in accordance with one or more embodiments.

Figure 1:
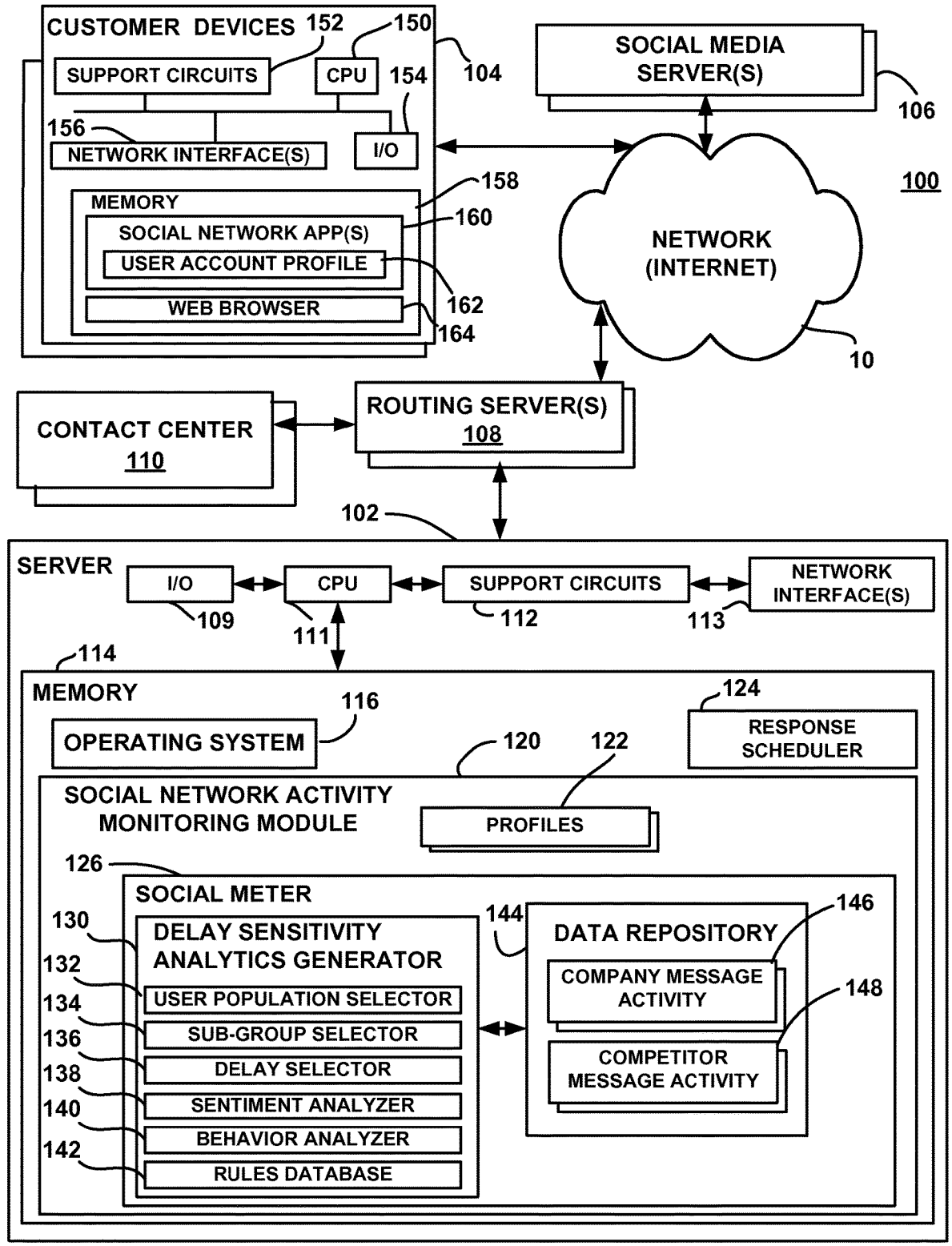
FIG. 1 is a block diagram depicting a communication system configured to identify and exploit variations in response time sensitivities among respective user populations (e.g., "identifiable groups") of users posting comments, complaints, inquiries and/or requests for information via one or more social network channels, according to one or more embodiments.

While the method and apparatus is described herein by way of example for several embodiments and illustrative drawings, those skilled in the art will recognize that the method and apparatus for operating a contact center through detection and analysis of dynamically variable social media activity associated with profiled users is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dynamically responding to requests and queries for information relating to one or more event invitees or attendees defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and techniques for assessing the sensitivity of different social network user populations to response time delays are described. In some embodiments, a contact center, or other system for responding to customers via social network channel(s), is configured so as to provide responses—to users determined to be members of a respective population groups—within a time frame selected to avoid traversal of a loyalty transition boundary.

In many contact centers, agents are expected to communicate with customers via voice channels, via instant messaging channels and, increasingly, via the use of social networking channels (e.g., posts to a Facebook or Twitter page maintained by the entity which the agents represent. There is a universal customer expectation, on the part of those customers relying upon a voice channel, that a connection will be made to an agent in a few minutes or less. To some extent, this is also true of instant messaging channels, as the very term "instant" implies (though the degree to which the customer may continue to work on other matters and even conduct a phone calls in the course of his or her business can give rise to a more protracted interaction between agent and customer).

The inventors herein have observed, however, that users who post inquiries, complaints, and/or requests for information about a product or service on the social network channel of a business entity have different views as to what constitutes a "timely" response on the part of an entity or its agents. It is the typical function of a contact center administrator to maintain a roster of agents which is both adequate in numbers and in training to meet the expectations of all customers, though the task of responding to social network channel inquiries and complaints may be delegated to a specific subset of the agent pool. Meeting customers' expectations for an adequate response time is important because it will increase customer satisfaction and decrease the danger of customer defections to the competition. Meeting customer expectations for a timely response is also important because it decreases the likelihood of repeat posts from the same customer, which would result in spending additional human and automated resources to process the repeat posts (including identifying them as such). Repeat posts are more likely when a customer does not know whether his/her previous post has been received and read by the business and when the customer gets impatient. Embodiments of the present disclosure introduce the concept of identifying, for one or more identifiable groups within a community of social network channel users, a respective time threshold that separates adequate from inadequate response times.

In accordance with embodiments of the present disclosure, a social network becomes a mechanism for collecting, on an accelerated basis, the various data needed to identify the acceptable response time upper limits applicable to users of a social channel. To this end, a system according to one embodiment automatically and continuously retrieves customer posts and their business responses, as well as all observable customer activities (e.g., Facebook likes) from a configured set of social network channels. The system also acts as a mediator between a contact center/business and its social network channels in the following way: the embodiment routes customer posts in the business' social network channel(s) representatives of the business and/or contact center agents, and the latter also respond to the posts through the system.

According to an embodiment, a system for determining sensitivity of a user population to response time delays monitors social network messaging activity of the user population to identify user messages created by members of the user population, subdivides the user population into N sub-groups, where N is an integer greater than one, schedules respective responses to corresponding identified user messages of the user population according to group, wherein responses to user messages of any group are delayed by a time delay different than those of each of the other groups, and determines if a loyalty transition boundary exists between any two groups of users.

In an embodiment, a user profile is either generated and stored for each user of the user population, or it is acquired from a third party such as the operator of one or more social networks. Each user profile corresponds to one of a plurality of social media users whose social network activity reflects interest in an entity (e.g., a "for profit" business), one or more competitors of that entity, and the products or services of both or either of these. Each user profile can include the name, social network "handle" or "handles", a customer account number, and other information specific to the user and of potential relevance to an entity in its customer relations management operations. As well, a user profile includes indications of sentiment collected over time and derived from social media event activities and/or behavior.

As used herein, "indications of sentiment" are intended to refer to any data or aggregation of data, or conclusions derived from data, from which it can be inferred that a user has formed or changed a perspective (whether to a positive, negative or neutral view) about, or is at least more willing or less willing engage with an entity, a competitor of the entity, and/or the product(s) or service(s) of an entity or its competitor(s) based on a delay in response time. Drawing an inference that a user has changed perspective about, or his or her willingness to engage with, an entity, can be appropriate if, after evaluating qualitatively and/or quantatively analyzed data to identify significant behavioral and/or articulated sentiment changes.

Explicit expressions of such sentiment can include tags, such as likes and dislikes, and the use of key words expressive of a perspective in a message, post or comment. Implicit expressions of such sentiment can include increases or decreases in a volume of social media activity. Of particular interest in one or more embodiments are shifts in sentiment. Sentiments shifts are more meaningful than absolute sentiment scores, in particular, when not correlated with other events/announcements/news, and the like so as to strengthen the inference that a delay in responding to an inquiry or complaint is more likely to have been the cause of a change in sentiment.

The volume of a user's social networking activity serves as a proxy for that user's perspective about an entity or his or her willingness to engage with entity. By way of illustration, a high level of posting or commenting activity, as measured in the total number of times a user posts a message or comment to a social network sites maintained or strongly associated with the entity, is deemed by some embodiments to reflect formation of a positive perspective about the entity or at least a willingness to engage with the entity. When the aforementioned volume of activity is accompanied by a low volume of activity on the site(s) of one or more competitors, the conclusion of a positive perspective about the entity is reinforced. Conversely, if the inverse is true (i.e. high interest and/or attentiveness to one or more of a competitor's social network sites), then the positive view is presumed to relate to the competitor especially if accompanied by low interest on the entity's own social network site(s).

In some embodiments, statistics are aggregated so that the user population includes the users of social network channels corresponding to a large number of entities, the user population sharing one or more attributes which enables the sensitivity data gathered for that population, as a group, to be applicable to respective contact centers operated on behalf of multiple entities whose customers share that attribute. In some embodiments, the attribute(s) include one or more socio-demographic attributes such, for example, as a gender, age, income, buying behavior, country of residence, language spoken, and the like. In other embodiments, the attributes comprise an attribute such as social network messaging sentiment or behavior (a loyalty score within a certain range, a volume of posting activity, selectivity of interest, etc). It suffices to say that the identification of given user population admits of substantial variation, with one objective of the segmentation being to identify the sensitivity threshold—within each of the identified group(s)—such that a minimally adequate level of contact center staffing can be used given the socio-demographic, behavioral, and/or sentiment profile for a particular organization served by that contact center.

When a social media user becomes more or less attentive to the entity's social networking site(s), or more or less attentive to one or more competitors' site(s), or both (in all cases as measured by relative volumes of social media activity or changes therein), this too is treated as an indication of sentiment according to one or more embodiments.

Various embodiments of a method and apparatus for assessing response delay sensitivity in one or more social network user populations are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts FIG. 1 is a block diagram depicting a communication system 100 configured to aid one or more entities such, for example, as a for-profit enterprise in the management of relationships with (a) one or more customers, (b) potential customers, and (c) those individuals having an influence over customers and/or potential customers. System 100 is configured to perform detection and analysis of the social network activities and/or behavior, of members of the aforementioned groups in order to build and maintain user profiles comprising, for example, behavioral and/or sentiment data over time for the users. To this end, system 100 includes a server 102, user (or customer) devices 104, one or more social networking site servers, collectively referred to as social media server(s) 106, one or more routing servers 108, and one or more contact centers 110.

The server 102 is a computing device, for example a desktop computer, laptop, tablet computer, and the like or the server 102 may be a cloud based server e.g., a blade server, virtual machine, and the like. The server 102 includes a Central Processing Unit (CPU) 111, support circuits 112, input/output circuits 109, network interfaces 113, and a memory 114. The CPU 111 may include one or more commercially available microprocessors or microcontrollers that facilitate data processing and storage. The various support circuits 112 facilitate the operation of the CPU 111 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a Social Network Activity Monitoring (SNAM) module 120, and a response scheduler 124. The operating system 116 may include various commercially known operating systems. SNAM module 120 includes a plurality of user/customer profiles 122 and a social meter 126. An example of a social network monitoring module which may be utilized to perform the functions of social meter 126 for embodiments of the present disclosure is described in U.S. Patent Application Publication No. US20140250182, owned by the Assignee herein and entitled SYSTEM AND METHOD FOR DETECTING AND ANALYZING USER MIGRATION IN PUBLIC SOCIAL NETWORKS, the disclosure of which is expressly incorporated herein by reference in its entirety.

With continuing reference to FIG. 1, it will be seen that social meter 126 includes a delay sensitivity analytics generator 130 that comprises a user population selector 132, a sub-group selector 134, a delay selector 136, a sentiment analyzer 138 and a behavior analyzer 140, as well as a rules database 142. Social meter 126 further includes a data repository 144 that includes, records of user-company messaging activity 146 and user-competitor message activity 148 collected from such public sources as social media servers 106. According to some embodiments, each messaging activity record includes the date and time of a message transaction, the content of the corresponding message, the author of the message as, for example, a subscriber handle, and the identity of the server from which the message was extracted. According to some embodiments, the message activity records within data repository 144 include message transactions from websites such, for example, as sites where an entity or its competitors announce the launch of a new product, those where those products are reviewed, and where individuals are invited to post comments, ask questions, or provide feedback about a product.

According to some embodiments, each user or customer profile 122 includes such information as the user's first and last name, his or her telephone number, email address(es), product purchase history, and sentiment scores obtained, for example, at specific times, over periodic intervals, or responsive to a specific event. In some embodiments, users having a VIP or other high priority classification may be excluded from assignment to a group subjected to response time delays, with members of this group receiving a specialized, fastest-possible treatment (if applicable) or a default response time based on a pre-existing standard set by an administrator. Likewise, in some embodiments, depending upon the size of the user candidate pool, a pre-filtering operation may be performed in which certain users—who might otherwise meet the criterion or criteria established in rules database 142 to define a particular user population—are removed from the candidate pool. Examples of exclusionary criteria may include, by way of illustration, a discernable pre-existing and persistent negative sentiment against an entity.

According to some embodiments, an administrator establishes the selection criterion or criteria for defining each user population to be subjected to delay threshold sensitivity analysis. The criterion or criteria, stored in rules database 142, are employed by user population selector 132 to identify a pool of users from the community of users who have posted a product inquiry, a complaint, or some other query to a social network channel sponsored and/or maintained by an entity. Based on the size of the community, sub-group selector 134 subdivides the user population into N sub-groups, where N is a number greater than one. In some embodiments, the number N is based on a determination of the maximum number of groups which can be formed and still provide statistically significant results given the number of users in the user population. Thus, in some cases, a first user population having a population $P_1$ may be divided into N sub-groups, while a second user population having a population $P_2$ which is significantly smaller than $P_1$ may be divided into M sub-groups, where N>M. Each user of user population $P_1$ is randomly assigned by user population selector 132 to one of groups $G_1$ to $G_N$.

Delay selector 136 assigns a different response delay $t_i$ to each of the respective subgroups as $G_1$ to $G_N$ for user population $P_1$, where i is an integer greater than or equal to 1 The value of $t_i$ can be randomly chosen by the delay selector 136 within configured limits. For example, if $t_i=3*i$ minutes for sub-group $t_i$, then $t_1=3$ minutes for subgroup 1. An important special case, in some embodiments, is where $t_i=0$, in which case system randomly picks the value of i for which $t_i=0$ applies. Once all users of population $P_1$ have been assigned to one of groups $G_1$ to $G_N$, response schedule 124 delays each business response entered into the system by a business representative ("agent") by $t_i$ time units. In other words, when a business representative responds to a customer post, the system does not post the response to the social network channel(s) immediately, but instead it schedules the response for posting to the channel(s) in $t_i$ time units.

Sentiment analyzer 138 and behavior analyzer 140 are configured to detect changes in sentiment and/or behavior based on analysis of posting activity gathered and stored in repository 144. Such operation is described in detail in commonly assigned U.S. patent application Ser. No. 14/452, 472 filed on Aug. 5, 2014 and entitled SYSTEMS AND METHODS FOR INFLUENCING CUSTOMER TREATMENT IN A CONTACT CENTER THROUGH DETECTION AND ANALYSIS OF SOCIAL MEDIA ACTIVITY, the disclosure of which is expressly incorporated herein by reference in its entirety The user device 104 is a computing device, for example a desktop computer, laptop, tablet computer, Smartphone, and the like. The user device 104 includes a Central Processing Unit (CPU) 150, support circuits 152, input/output (I/O) circuits 154, network interfaces 156, and a memory 158. The CPU 150 may include one or more commercially available microprocessors or microcontrollers that facilitate data processing and storage. The various support circuits 152 facilitate the operation of the CPU 150 and include one or more clock circuits, power supplies, cache, input/output circuits, and the like. The memory 158 includes at least one of Read Only Memory (ROM), Random Access Memory (RAM), disk drive storage, optical storage, removable storage and/or the like. The memory 158 includes an operating system (not shown) that provides a computing foundation for software modules of the user device 104. The memory 158 includes one or more commercially available browsers 160 that allow the social media servers 106 to receive, authenticate and/or process message activity transactions originated by the users of customer devices 104.

The social networking site server 106 is host to a social networking site, for example, FACEBOOK, LINKEDIN, TWITTER, BEHANCE, and the like. The social media server 106 manages social interactions which include any form of social engagement. In one embodiment, social interactions include a number of likes/dislikes for a company, one of its competitors, or a product or service offered by either. In another embodiment, social interactions include stored comments for a company, competitor or product/service. In yet another embodiment, social interactions managed by social media server 106 include both a number of likes/dislikes for a company, competitor or product/service and stored comments. In still a further embodiment, social interactions are considered on a purely volumetric basis without regard to the content of any particular message. For analytical purposes, however, it is important that the social interactions include identifying information about the party who originated the social interaction.

A network 10 includes a communication system that connects computers (or devices) comprising the server 102, customer devices 104, social media servers 106, routing servers 108, and contact center 110 by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

Contact center 110 is a conventional contact center such as that offered by Avaya Inc and described in U.S. Pat. No. 6,453,038 issued on Sep. 17, 2002 and entitled SYSTEM FOR INTEGRATING AGENT DATABASE SKILLS IN CALL CENTER ARRANGEMENT, which is expressly incorporated herein by reference in its entirety. In a well known manner, contact center 110 includes one or more queues, and is configured to schedule and establish communication sessions between the respective communication terminal of a contact center agent and a customer or potential customer of an entity. According to some embodiments, system 100 is configured to prompt agents to respond to each of the inquiries received via the social network channels from users of each user population as user population $P_1$. As will be described in detail shortly, the operation of contact center 10 can be modified, following the gathering of response threshold statistics by SNAM module 120, so as to route response tasks to a smaller roster of agents than could be justified prior to the availability of such statistics.

As noted previously, detection of changes in sentiment resulting from a delay in response time, is formed by the delay sensitivity analytics generator 130 of social meter 126. Analytics generator includes sentiment analyzer 138 and a behavior analyzer 140. According to some embodiments, sentiment analyzer 138 accesses comments left by each user of a community of users at one or more sites of social messaging activity and indirect social messaging activity, and determines a sentiment value for each comment. Any existing technique may be used to analyze sentiment. In one example, the returned sentiment value is determined to be a value within a pre-determined range, for example −100.0 to +100.0, where a negative value represents a negative sentiment and a positive value represents a positive sentiment. In addition, the actual value represents the extremeness of a sentiment. For example, a comment that includes the word "love", for example, "love this feature" in relation to a company product, would have a higher actual value as it is considered strongly positive and a comment that includes the word "reasonable", for example, "reasonable performance" that is considered moderately positive.

In another embodiment, a baseline value for page visits or the like is established for each user over an initial monitoring period and, thereafter, an increase in volume to an entity's site is assigned a positive score, and a decrease is assigned a negative score. These scores are further adjusted, upward or downward, based on whether the increases come at the expense of one or more competitors (i.e. upward adjustment) or the decreases reflect a user's increased attentiveness at the site(s) of one or more competitors. The latter analysis is performed by the behavior/migration analyzer 134, which tracks the relative levels of attentiveness by measuring the volumes of user social messaging activity at sites of the entity and its competitors.

In the various embodiments of the present invention, the sentiment analyzer 138 and migration analyzer 140 are configured to support a variety of communication modes. For example, the analyzers 138 and 140 can be configured to support a client-server communication mode with one or more of direct social media channels. That is, analyzers 138 and 140 may initiate a request for information by way of a standardized message such as, a message in accordance with an API interface understood by a direct social media channel to a social media server 106 as for example, Facebook. The direct social media channel acts as a server and delivers the requested information to the analytics generator 130. However, the various embodiments are not limited in this regard and any other type of communication mode may also be used.

The behavior analyzer 136 is further configured to monitor predetermined activities of a social media user. In an embodiment of the present invention, the behavior analyzer 140 is configured to continuously monitor for predetermined activities that the social media user conducts while visiting a social networking site, in particular one or more predetermined business or personal Facebook pages, which may be grouped into a configurable set of Facebook pages ("Page mix"). Predetermined activities may include posting of messages (i.e., posts), comments (e.g., responses to other posts), likes or dislikes, posting or viewing of photos, tags (i.e., identification of a person in a photo), and substantially any other publicly visible user and/or page-owner expressions.

The Page mix may contain a link to the social media or social media channels of a business's known competitors' pages, and a link to Facebook pages of other businesses (e.g., competitors, suppliers, customers, peers, etc.). An activity recorder records new activities and adds the new activities to a repository of activities that may be searched by either Page ID or activity owner ID.

In another embodiment of the present invention, the sentiment analyzer 138 may determine a dynamic Page mix for a customer profile under the direction of the system user. A dynamic Page mix may include additional pages that social media user who have been active on an initially determined static core Page mix may have also been active on. For example, if a system user represents company 'A', the core Page mix may include all of A's Facebook pages. For each social media user who has been active on these pages, the event selection system would determine and track which other page(s) the social media user interacted with and add those pages to the Page mix. Further, sentiment analyzer 138 may monitor social media users' behavior across different Facebook pages, with pages to monitor being identified in advance to monitor temporal closeness of social media users' actions. The temporal closeness of social media users' actions may indicate that actions that take place close in time are more significant for the system user than if they take place farther apart in time. For example, public Facebook pages identified for monitoring are linked in some sense, for example, pages for Company 'X' that has competition 'Y' and 'Z', or a set of different Facebook pages each tailored to a different demographic, different geography, or the like. Further, suppose an owner of the pages wants to track how a social media user behaves across these public Facebook pages such as a company may want to measure itself against a competitor in some way, or monitor how often social media user jumps back and forth between the company pages and the competitor's pages.

Further, the sentiment analyzer 138 is configured to monitor temporal aspects of the social media users' viewing across the monitored pages. In an embodiment of the present invention, temporal aspects of the social media users' may be monitored by way of a relative time stamp. The relative time stamp indicates the elapsed time between observable events on monitored social media channels. The observable events may include posting a comment, replying to a comment, tagging, liking, disliking, etc. Furthermore, the sentiment analyzer 134 is configured to mine social media user related data from social media channel. In an embodiment of the present invention, a primary source for collecting the social media data may be via application programming interface (API) functions available from a social media server 106 such as in Facebook.

A great volume of social network data typically available for analysis in accordance with embodiments of the present disclosure. Thus an enterprise or other entity may gather not only data relating to the specific interactions between it and different subgroups of users, as obtained herein, by also to the specific interactions between such users and its competitors (including responsiveness and loyalty). In embodiments, this data is acquired and mined to provide the input required for sentiment analyzer 138 and behavior analyzer 140. According to some embodiments, an administrator is presented with a dashboard to allow specific time windows to be defined for use by delay selector 136, and to graphically depict various relationships such as loyalty, responsiveness, and staffing levels over time, and also to show some relationships for selected competitors.

In regular time intervals, certain behavioral metrics are analyzed by sentiment analyzer 138 and/or behavior analyzer 140 for the customers in each sub-group. The behavioral metrics quantify customer behavior such as "channel engagement", "channel loyalty", and "channel migration". The data for computing these metrics is collected the same way as described above. An optimal response time sought by the business is typically the value of $t_i$ for the subgroup i such that i is the largest index (in the above example for the $t_i$ selection) whose customer behavioral metrics still fall within configured values. Such a threshold is defined herein as an example of a loyalty transition boundary. For example, if a business' behavioral metric of choice is "channel engagement", as measured in the number of observable customer activities in the channel (e.g. the # of posts+# of tags+#comments+#photo uploads+#likes), the loyalty transition boundary (e.g., the desired threshold value for channel engagement) might be "no less than 85% of channel engagement attained through immediate (non-delayed) responses". [RK: There are a few loyalty metrics that we use, aside from customer engagement. Some of these loyalty metrics have been disclosed before or mentioned above. For example, "channel migration", "channel focus", "customer sentiment", "customer resonance". "Channel focus" is a measure of how many different social media channels a customer has been active in (from how many different businesses), expressed as a score between 0 and 1, with 1 being the highest focus, where the customer only showed activities in one business' channel. "Customer resonance" is not strictly speaking a measure of loyalty but a measure of how many other customers comment on this customer's posts, further differentiated by negative/positive comments on this customer's posts. This metric acts as a measure of the negative/positive influence a customer might have. Do you need more details?]

If a trend appears to predict traversal of a loyalty transition boundary, the staffing levels can be increased or the skills of existing members of the agent pool can be increased, through training. If the trend is slowly progressing, the changes can be made incrementally. Reductions in staffing can likewise be made incrementally until a trend toward the loyalty transition boundary is discernable via the dashboard or other mechanism for graphically presenting results to the contact center administrator.

Figure 2:
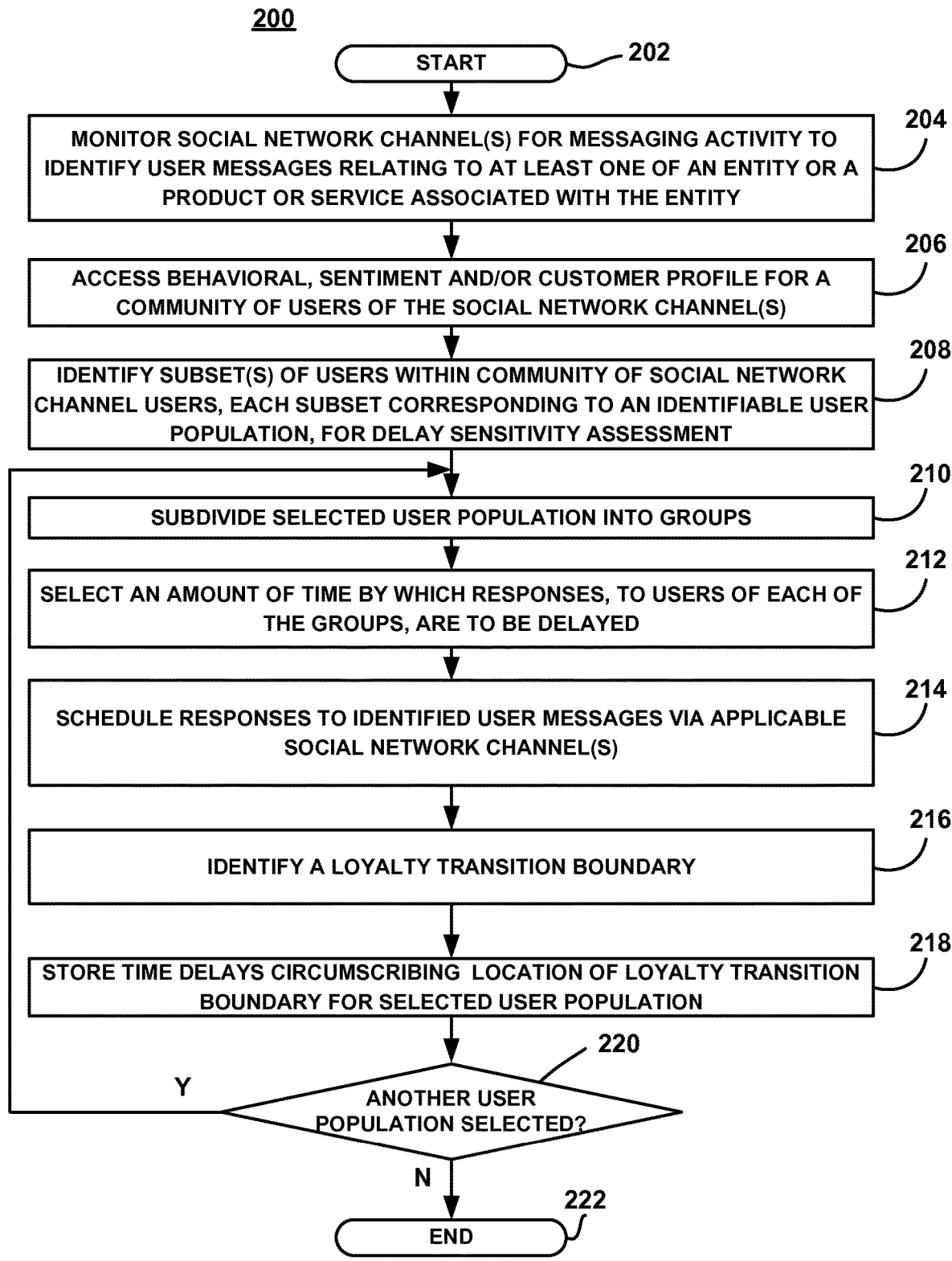
FIG. 2 is a flow diagram depicting a method for estimating the sensitivity of a user population, posting messages to one or more social network channels, according to one or more embodiments.

FIG. 2 is a flow diagram depicting a method 200 for estimating the response delay sensitivity of a user population, posting messages to one or more social network channels, according to one or more embodiments.

The method 200 starts at step 202 and proceeds to step 204. At step 204 the method 200 monitors one or more social network channels(s), typically operated directly or on behalf of, an entity such as a commercial enterprise or the like. The method 200 monitors the channel(s), for example, for messaging activity which relates in some way to the entity or one of its products, service or the like, as determined by the user of one or more key words, phrases, product names, expressions or certain punctuation marks (e.g., "?"), to identify those message which appear to be soliciting a response from the entity.

The method 200 proceeds to step 206. At step 206, a behavioral, sentiment and/or customer profile for users of the social network channel(s) responsible for the messages identified in step 204. Those users for whom no relevant profile data exists are excluded from a community of users for which further investigation is to be performed according to method 200. The method proceeds to step 208.

At step 208, the method 200 identifies one or more subsets of users within the community of social network channel users (each, a "user population") for response delay sensitivity and threshold analysis. In some embodiments, the community of users is evaluated on the basis of the basis of one or more socio-demographic criteria reflected in one or more of these profiles in order to define one or more user populations. In other embodiments, the user population is selected on the basis of sentiment or behavior exhibited in prior social networking activity to define one or user populations.

By way of illustrative example, if the profile of the contacting party reflects sentiment and/or migration analysis which shows that the contacting party has traditionally been a loyal customer of a competitor of the entity, and that the contacting party has recently been interested in the products and/or services of the entity, then the user may be selected for inclusion in a first user population. Likewise, if the contacting party has traditionally been a loyal customer of the entity, but has recently been showing signs, on a volumetric basis, of being less attentive to the entity's own brand and product messages and more attentive to those of the competitor, such a customer might be included as a member the first user population or as a member of a second user population.

The method 200 proceeds to step 208. At step 210, each user population (subset) is subdivided into N groups, where N>>1. In an embodiment, each user of a user population is randomly assigned to any of groups $G_1$ to $G_N$. At step 212, the method 200 selects a different amount of delay for each of the N groups. In an embodiment, the delays are a number of minutes randomly assigned to the groups. Alternatively, the delays may increase monotonically in equal increments measured in minutes from $G_1$ to $G_N$. As an illustrative example, there may be thirty groups, with the delay spacing between groups being ten minute increments beginning at 10 minutes for group G1 and ending at 300 minutes (five hours). The method 200 proceeds to step 214.

At step 214, the method 200 schedules responses to identified user messages via the applicable social network channel(s). The task of creating an appropriate response is delegated to an appropriate business representative (e.g., a contact center agent trained to handle queries of the type represented by the request). Once a response is generated, the social network channel(s) scheduled to receive a response is/are the same one(s) which the corresponding user relied upon to post an inquiry, complaint or other query. The method proceeds to step 216.

At step 216, the method 200 identifies a loyalty transition boundary (or "metric"). In some embodiments, the loyalty transition boundary is identified by detecting a difference in aggregate sentiment between any pair of the N groups (e.g, a first of the N groups and a second of the N groups), where the difference is greater than a certain threshold. An optimal response time in such embodiments is found by identifying the delay time of the sub-group just before the transition.

In other embodiments, an optimal response time is found by method 200 at step 216 by identifying the sub-group which has both the largest delay and all selected loyalty transition metric(s) still falling within configured values. In an embodiment, a single behavioral metric may be tracked to determine whether a loyalty transition boundary has been traversed. One such behavioral metric is "channel engagement". The channel engagement metric, as described previously, is a function of the number of observable customer activities in the channel (e.g. the # of posts+# of tags+#comments+#photo uploads+#likes). By way of illustration, the loyalty transition boundary (e.g., the desired threshold value for channel engagement) is set to be "no less than 85% of channel engagement attained through immediate (non-delayed) responses".

At step 218, the method stores the time delays which circumscribe the location of the loyalty transition boundary for the selected user population. Thus, for example, if the channel engagement metric moves below the 85% threshold for sub-group $G_{12}$ where responses are scheduled for publication via the social network channel at 36 minutes, while the channel engagement metric remains above this threshold for all subgroups having a faster response time—including sub-group $G_{11}$ having a response time of 33 minutes—then these two values are stored at step 218. In alternate embodiments, only the $G_{11}$ delay value is stored. In yet another embodiment, the channel engagement metric and time delay value is stored for each sub-group. In some embodiments, method 200 initiates display of a dashboard which shows the correlation between the response time and the loyalty transition The law of diminishing returns can be observed in staffing decisions, based upon assessments of response delay sensitivity acquired by embodiments of the present disclosure and presented for display as a dashboard. For example, if reducing a sub-group average response time from 30 minutes to 20 minutes results in only a 5% gain in loyalty by members of that group, but is achieved at a staffing cost increase of 10%, an appropriate business response might be to reduce the staffing level back to its prior level. If no intrinsic threshold of diminishing returns can be discerned, a dashboard showing fluctuations over tome can still enable informed decision making. The business may, for example, look at prior weekly results and decide at the beginning of a subsequent week where the desired point on the curve is and this may be driven on a dynamic basis (to vary over time) based on additional observations. For example, over a first month, it may be determined that a delay reduction yields a 1% improvement in loyalty but staff levels must increase by 5% to achieve it, so the staff levels will not be changed that month. In the next month, a trend may be observed, through monitoring of the appropriate social network channels—that the enterprise's competition is gaining loyalty share for customers of the sub-group. In this case, even if the same cost-benefit relationship remains between staffing level and subgroup response time persists, the need to react to competitive pressure could warrant the adjustment.

In any event, and with continuing reference to FIG. 2, it will be seen that the method 200 proceeds from step 218 to decision block 220. At decision block 220, the method 200 determines whether another user population has been selected. If not, the method proceeds to step 222 and terminates. If so, then the method 200 returns to step 210, the newly selected user population is subdivided and, the method proceeds through steps 212 to 218 as just described.

Figure 3:
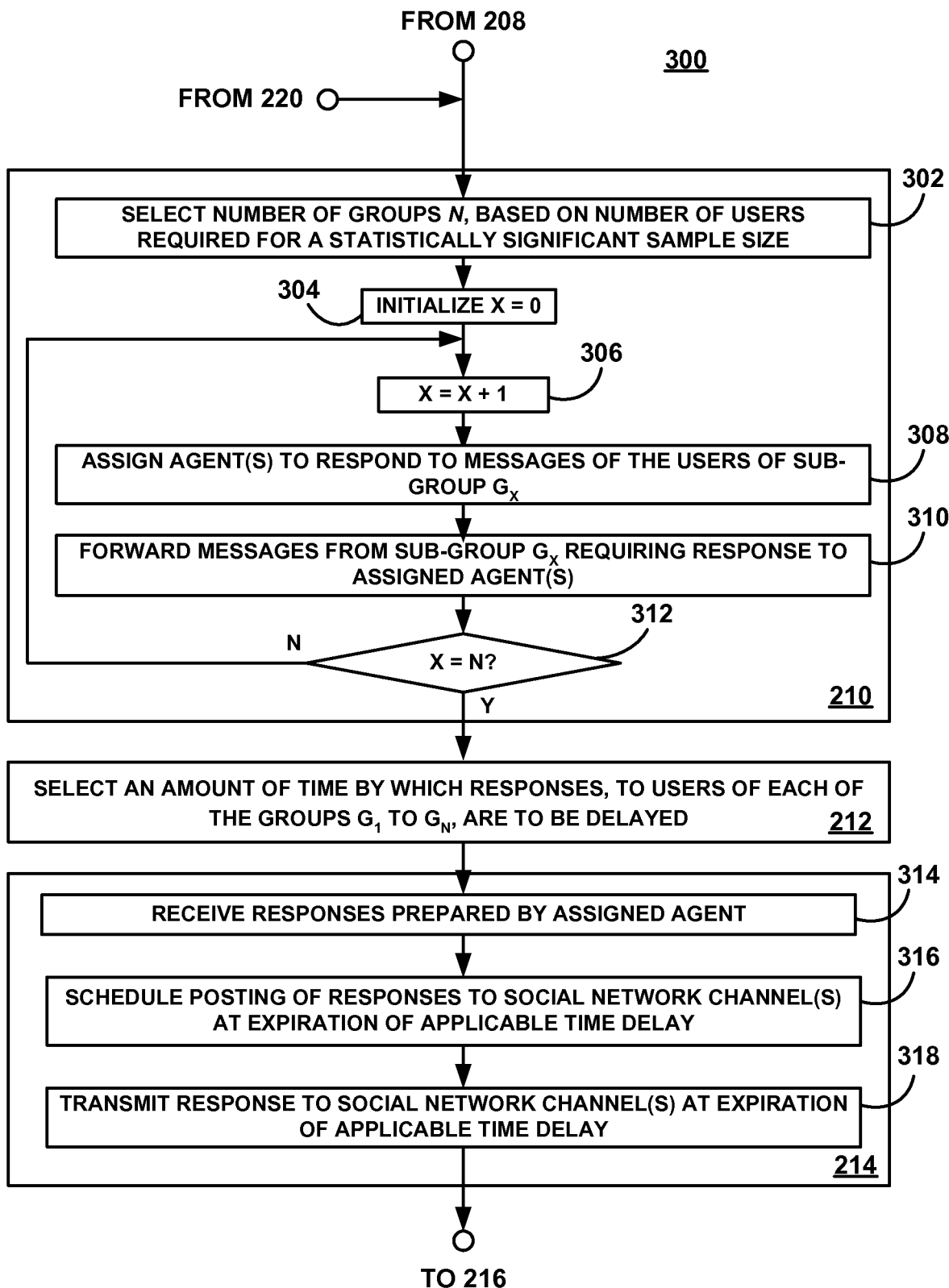
FIG. 3 is a flow diagram depicting aspects of the method, depicted in FIG. 2, which relate to the scheduling of responses to the messages posted by users assigned to respective sub-groups of the user population, according to an embodiment.

FIG. 3 is a flow diagram depicting aspects of a method 300, forming part of method 200 depicted in FIG. 2 and relating to the scheduling of responses to the messages posted by users assigned to respective sub-groups of the user population, according to an embodiment. The method 300 encompasses steps 210, 212 and 214 of FIG. 2, and begins at step 302. At step 302, the method 300 selects a number of sub-groups N based on the number of users required to obtain a sample size large enough to represent a statistically significant sample of the user population under investigation. The method 300 proceeds to step 304, where the sub-group counter, X, is initialized by setting it to zero. The method 300 then proceeds to step 306.

At step 306, the method 300 increments by 1 and proceeds to step 308 where representatives of a business (e.g. contact center agents) are assigned the task of responding to the messages received, from users assigned to subgroup $G_X$, over the social network channel(s). From step 308, the method 300 proceeds to step 310, where the method forwards messages, responsive to the sub-group $G_X$ users, to the assigned agents. The method 300 then proceeds to step 312, where the method determines whether there are any remaining sub-groups for which assignment of agents is still required. If so, the method 300 returns to step 306 and again increments the sub-group counter by 1. If no (i.e., X=$_N$), then the method 300 advances to step 212, selecting an amount of time by which responses, to users of each of the groups $G_1$ to $G_N$, are to be delayed.

The method 300 proceeds to step 314, where the method receives responses prepared by the assigned agents. The method 300 then proceeds to step 316, and schedules posting of responses to the appropriate social network channel(s) at expiration of the applicable time delay. The method 300 then proceeds to step 318, where the method transmits each response to the appropriate social network channel(s) upon expiration of the applicable time delay. The method 300 then returns to step 216 of method 200.

Figure 4:
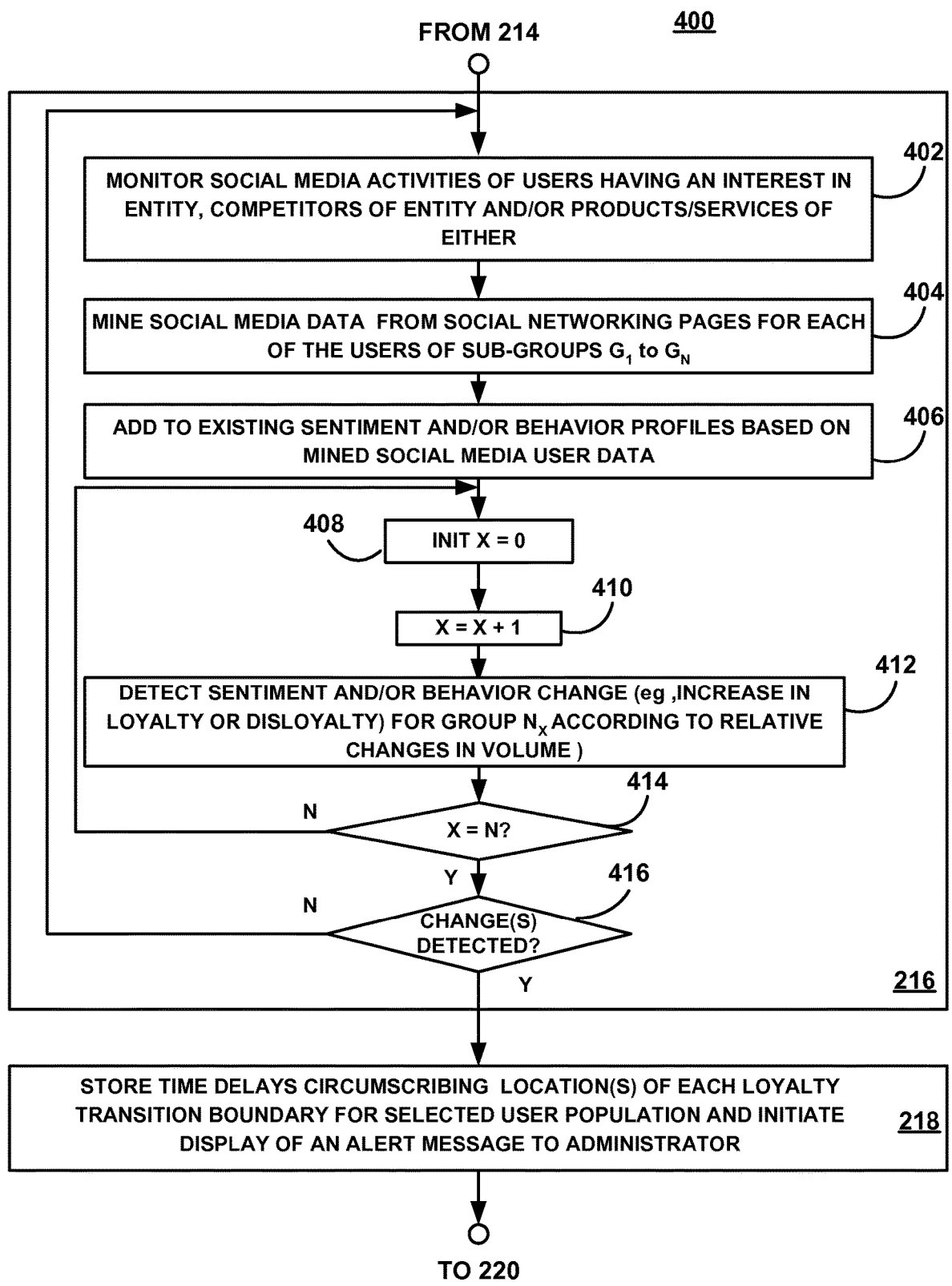
FIG. 4 is a flow diagram depicting aspects of the method, depicted in FIG. 2, which relate to the detection of a loyalty transition boundary according to an embodiment.

FIG. 4 is a flow diagram depicting aspects of method 400, forming part of method 200 depicted in FIG. 2 and relating to the detection of a loyalty transition boundary to an embodiment. The method 400 encompasses steps 216 and 218 of FIG. 2, and begins at step 402.

At step 402, the method 400 monitors social media activities of users having an interest in an entity, competitors of an entity, and/or products/services of either. The method 400 then proceeds to step 404, where the method mines social media data from social networking pages for each of the users of sub-groups $G_1$ to $G_N$.

From step 404, the method 400 proceeds to step 406, where time-stamped behavioral events such as the number of social network posts, number of tags, number of comments, number of photo uploads, and number of likes are stored as part of a profile maintained for each user of the user population. These items can be tracked on a volumetric basis, the method detecting changes in volume, over time, in that portion of users' social media activity associated with the entity of interest, its competitor(s), and the products of either or both of these. These can be aggregated and averaged to provide an overall index for the entire group. For purposes of analysis and processing according to one or more embodiments, a measurable change in sentiment, as defined by a sentiment score corresponding to relative volumetric change(s) in user social messaging activity and/or ratings derived from words and phrases within a user's messages, which occurs within a defined window relative to the posting of the user's query is deemed to be attributable to a delay in response The method 400 then proceeds to step 408, where the sub-group counter is initialized by setting the value X to zero. The method 400 then proceeds to step 410.

At step 410, method 400 increments the sub-group counter by 1, and proceeds to step 412. The user profiles of first sub-group $G_1$ are evaluated to detect sentiment and/or behavior changes (e.g., increase or decrease in loyalty, in channel engagement, or migration to a competitor). If additional sub-groups remain for evaluation, the method 400 returns to step 410, where the sub-group counter is incremented by 1 and the evaluation of that sub-group is performed as above described. This process is repeated iteratively until method 400 determined, at step 414, that all sub-groups have been evaluated. At this point, method 400 proceeds to step 416 and a determination is made as to whether any changes representative of a loyalty transition boundary (i.e., crossing of a responsiveness delay tolerance threshold) has crossed. If not, the process proceeds to step 408 and the evaluation process of steps 410 to 414 is repeated. If so, the method proceeds to step 218 and stores the time delay and loyalty metric data, for each of the subgroups, for dashboard display or, in other embodiments only the time delays applicable to the groups between which the loyalty transition is present are stored. The method 400 then proceeds to step 220 of method 200.

Figure 5:
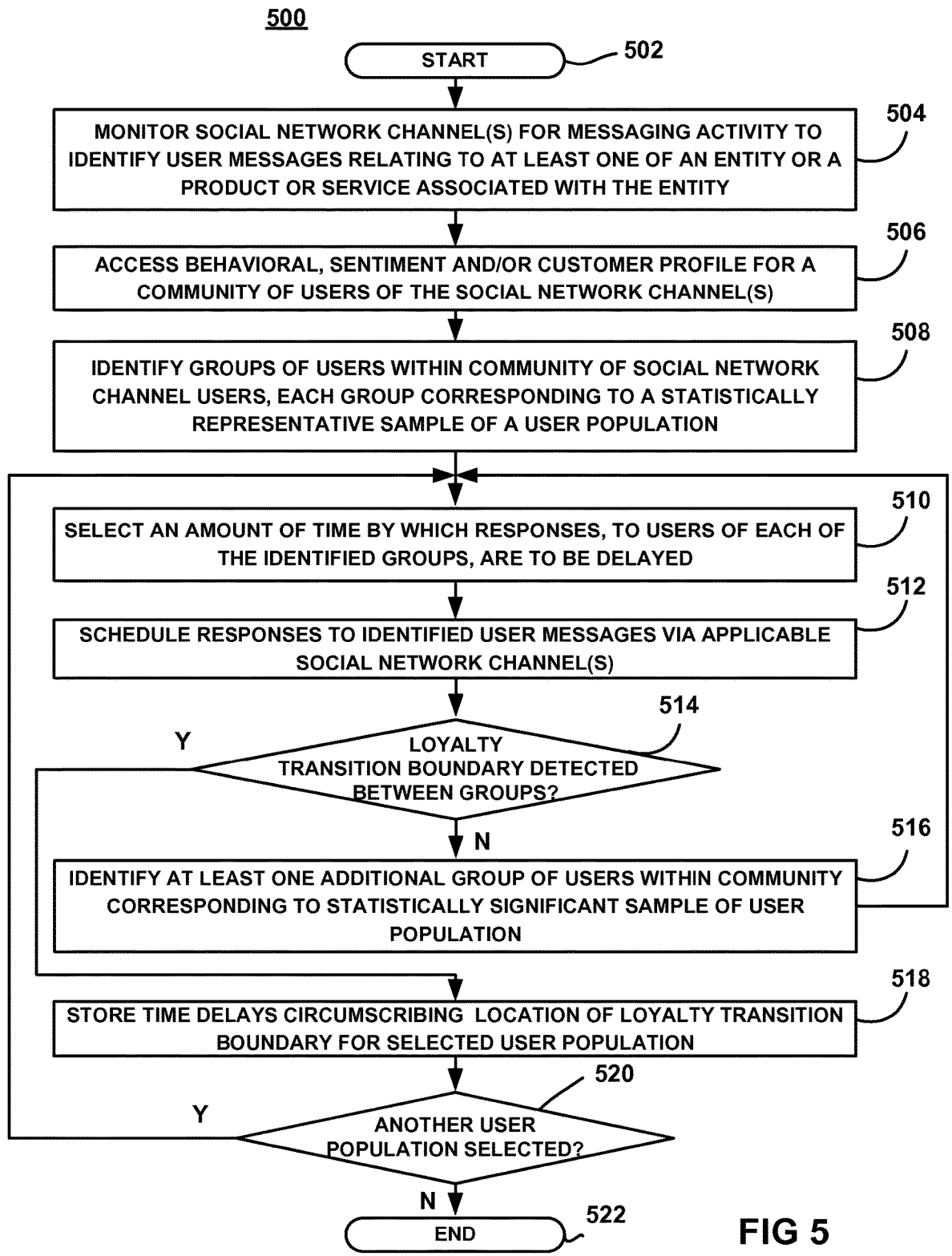
FIG. 5 is a flow diagram depicting a method for estimating the sensitivity of a user population posting messages to one or more social network channels, according to one or more embodiments.

FIG. 5 is a flow diagram depicting a method 500 for estimating the sensitivity of a user population posting messages to one or more social network channels, according to one or more embodiments. Method 500 is similar to the method 200 of FIG. 2, but differs in the manner in which the loyalty transition boundary detected.

The method 500 starts at step 502 and proceeds to step 504. At step 504 the method 500 monitors one or more social network channels(s), typically operated directly or on behalf of, an entity such as a commercial enterprise or the like. In an embodiment, the method 500 monitors the channel(s) for messaging activity to identify those messages which appear to be soliciting a response from the entity.

The method 500 proceeds to step 506. At step 506, method 500 accesses a behavioral, sentiment and/or customer profile for users of the social network channel(s) responsible for the messages identified in step 504. Those users for whom no relevant profile data exists are excluded from a community of users for which further investigation is to be performed according to method 500. The method proceeds to step 508.

At step 508, the method 500 identifies groups of users within the community of social network channel users (each group being a statistically representative sample of a "user population") for response delay sensitivity and threshold analysis. In some embodiments, the community of users is evaluated on the basis of the basis of one or more sociodemographic criteria reflected in one or more of these profiles in order to define one or more user populations. In other embodiments, the user population is selected on the basis of sentiment or behavior exhibited in prior social networking activity to define one or user populations. According to an illustrative embodiment, users of the user population are assigned randomly to the identified groups and, at step 510, the method 500 selects a respective amount of time by which responses, to messages received from users of each group, are delayed. The process proceeds to step 512.

At step 512, method 500 schedules delayed responses to the identified user messages via applicable social network channel(s), the amount of delay being determined at step 510 based on the group to which the originator of the message soliciting a response belongs. The method 500 proceeds to step 514.

At step 514, a determination is made as to whether a loyalty transition boundary exists between any of the groups to which users of the user population have already been assigned. Such determination may be made in the same manner as discussed in connection with the method 200 depicted in FIG. 2. If a boundary is determined between any two of these groups, method 500 proceeds to step 518 where the group delays and corresponding loyalty transition metric(s) are stored and, in some embodiments, displayed to a dashboard to aid a contact center administrator. From step 518, the method 500 proceeds to step 520, where a determination is made as to whether any other user populations are to be investigated for response delay sensitivity. If not, the method 500 terminates at step 522. If so, the method returns to step 510 and is repeated for the next user group.

If, at step 514, no loyalty transition is detected, the method 500 proceeds to step 515 and identifies at least one additional group of users within the community of users, each of the additional group(s) corresponding to a statistically significant sample of the same user population as the pre-existing groups. In some embodiments, the process of adding groups and continuing to schedule delayed responses according to delay periods respectively assigned to each group is continued until a loyalty transition boundary is detected at step 514.

Figure 6:
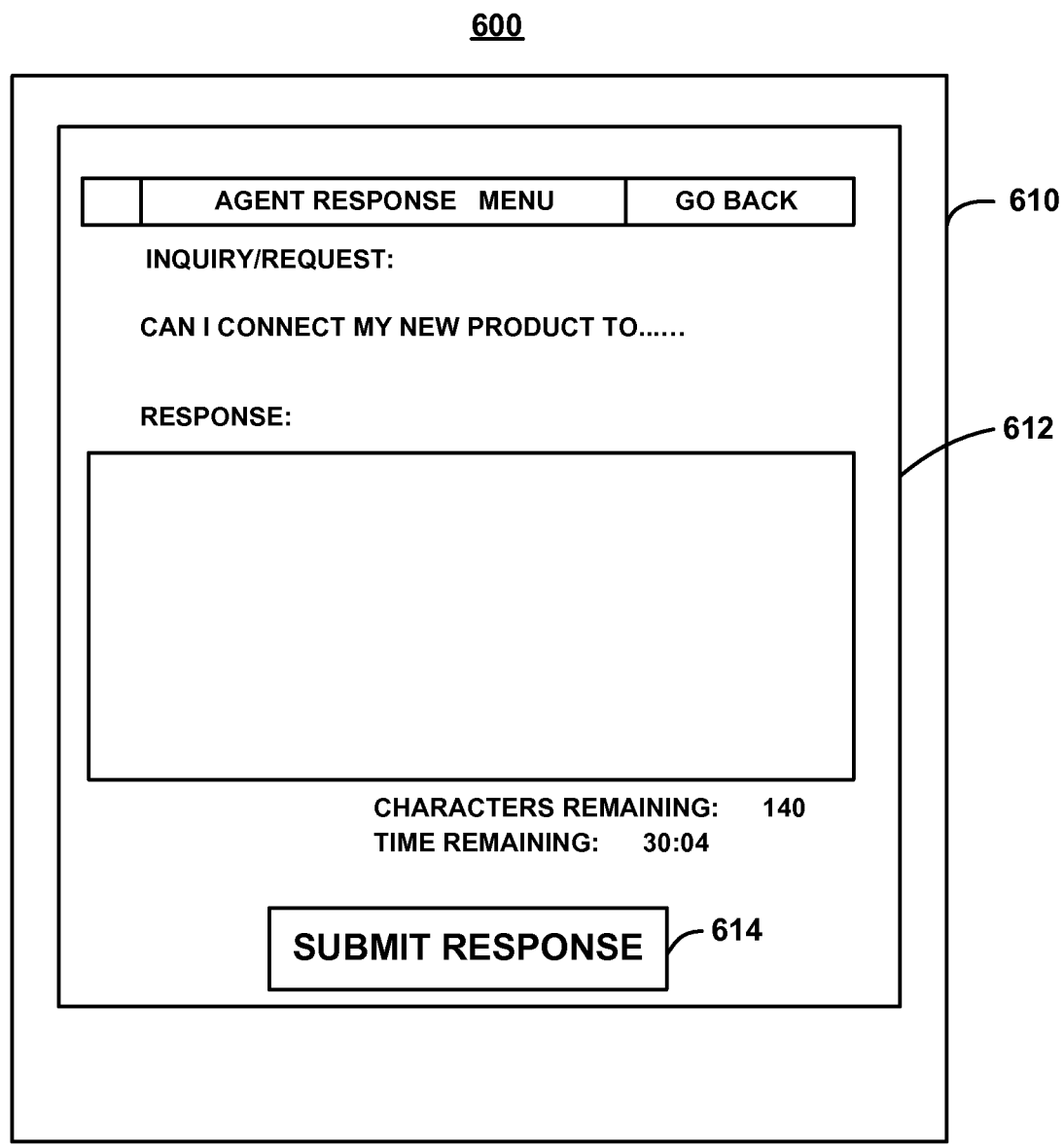
FIG. 6 is a screen view depicting the presentation, to a contact center agent, of an inquiry received from a user assigned to a user population sub-group and for which a response is to be provided by the agent and scheduled for posting to one or more social network channels in accordance with one or more embodiments.

FIG. 6 is a screen view depicting the presentation, to a contact center agent, of an inquiry received from a user assigned to a user population sub-group and for which a response is to be provided by the agent and scheduled for posting to one or more social network channels in accordance with one or more embodiments. FIG. 6 illustrates a user interface 600, displayed on a contact center agent's communication terminal, and obtained by execution of response scheduling instructions by a processor. Displayed at the agent's terminal is the wording of a user's inquiry, complaint or query as posted on a social networking channel. In some embodiments, the agent to which a response task is assigned sees, on the display 610 of his or her contact center communication terminal, a user interface 612 identifying prior posting activity which may be relevant, as well as a text box for the agent to enter an appropriate response for delayed posting to the same communication channel(s) as the one(s) used by the user. Optionally displayed on user interface 612 is a character limit counter, and a time remaining before the response must be submitted by the agent to the response scheduler. A soft button 614 enables the agent to submit the response to the scheduler for subsequent posting to the social network channel(s).

FIG. 7 is a screen view depicting an illustrative profile 700 of a user from whom a complaint, inquiry or request has been received via one or more social network channel(s) and for whom one or more responses have been scheduled and/or posted to the social network channel(s) in accordance with one or more embodiments. The profile 700 includes such information as the name of the user, the gender, an endpoint address such, for example as an email address, telephone number, or IP address, a primary language of the user, and other information of interest. According to an embodiment, the profile 700 also includes a timeline showing changes in the customer's sentiment score with respect to time, with an indication of any specific inquiries and the timing of responses, as exemplified by reference numeral 702.

A response delay window 704 is associated with message n and is correlated to a downward trend in a measure of user sentiment known as the company favorability score—an example of a loyalty metric. Recalling the methods exemplified by the embodiments of FIGS. 2 and 5, a company favorability threshold may be set for the company favorability score. The scores of all users within a sub-group to which the profiled user belongs are averaged and tracked as an index. When the index crosses below the threshold, this represents a loyalty transition boundary and, in some embodiments, the threshold crossing is reported to the contact center administrator as part of a dashboard display. As well, an alert may be generated which prompts the administrator to view the dashboard display and take any corrective staffing or training actions.

The generation and use of profiles, developed at the group or sub-group level according to some embodiments, enables the social media activities of one or more entire customer subpopulation(s) to analyzed during a given timeframe relevant to the aforementioned loyalty transition monitoring. Such analysis furthers the purpose of improving/strengthening relationships with customers or prospective customers. In some embodiments, an entire subpopulation receives a "profile", and the profile contains information which when viewed at the display of a contact center administrator's workstation, informs the administrator's staffing and training decisions. Such a profile is separate and apparent from any profile which may exist for the users as individuals and can be completely agnostic or silent about the sentiments of the specific customer in contact with a particular agent.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for determining sensitivity of a user population to response time delays, comprising:
   in a server, monitoring social network messaging activity of the user population to identify user messages created by members of the user population;
   subdividing the user population into N groups, where N is an integer greater than one;
   forwarding the identified user messages of the user population to respective communication terminals of contact center agents assigned to respond to the identified user messages;
   scheduling respective responses to corresponding ones of the identified user messages according to group;
   receiving the responses from the communication terminals;
   transmitting the responses in accordance with the scheduling, wherein responses to user messages of any group are delayed by a time delay different than those of each of the other groups;
   determining if a loyalty transition boundary exists between any two groups of users, wherein the loyalty transition boundary comprises a metric indicating a difference in aggregate user sentiment between two groups of users; and
   upon determining that the loyalty transition boundary exists,
      presenting an indication of the loyalty transition boundary in correlation with the time delay for each of the two groups.

2. The method according to claim 1, further including assigning users of a social network channel to the user population based on at least one of
   a socio-demographic characteristic identified by reference to a stored user profile, user behavior observed in activity monitored on one or more social networks, or user sentiment observed in activity monitored on one or more social networks.

3. The method according to claim 2, wherein the user population is a first user population, the method further comprising
   assigning users to a second user population based on at least one of
      a socio-demographic characteristic identified by reference to a stored user profile,
      user behavior observed from activity monitored on one or more social networks, or
      user sentiment observed from activity monitored on one or more social networks;
   monitoring social network messaging activity of the second user population to identify user messages;
   subdividing the second user population into M groups, where M is an integer greater than one;
   scheduling respective responses to corresponding identified user messages of the second user population according to group, wherein responses to user messages of any group of the second user population are delayed by a time delay different than those of each of the other groups of the second user population; and
   determining if a loyalty transition boundary exists between any two groups of users of the second user population.

4. The method according to claim 2, wherein each identified user message relates to at least one of an entity or a product or service associated with the entity, and
   wherein each user profile includes at least one of
      an indication of a user's sentiment toward the entity at one or more points in time;
      an indication of a user's sentiment toward a competitor of the entity at one or more points in time; or
      an indication of a user's sentiment toward a particular product or service offered by the entity or a competitor of the entity at one or more points in time,
      wherein each indication of user sentiment is derived from the monitored social network messaging activity.

5. The method according to claim 4, wherein determining existence of a loyalty transition boundary comprises
   evaluating the user profiles of users of a first of the N groups to compute a first aggregate sentiment score;
   evaluating the user profiles of users of a second of the N groups to compute a second aggregate sentiment score; and
   detecting a statistically significant difference, between the first aggregate sentiment score and the second aggregate sentiment score.

6. The method according to claim 4, wherein the monitored activity includes at least one of posts, comments, likes, or tags expressed by the at least some of the users via one or more social network channels.

7. The method according to claim 6, wherein the loyalty transition boundary corresponds to a time beyond which sentiment shifts in a direction that is at least one of:
   away from the entity;
   toward a competitor of the entity;
   away from a product or service offered by the entity; or
   toward a product or service offered by a competitor of the entity.

8. The method according to claim 1, wherein scheduling a response comprises forwarding a comment or inquiry by a customer or prospective customer to a contact center agent.

9. A computer implemented method for assessing response time sensitivity in a user population, comprising:
in a server, monitoring social network messaging activity to identify user messages relating to at least one of an entity or a product or service associated with the entity;
forwarding to respective communication terminals of contact center agents assigned to respond to the identified user messages;
scheduling a response to each message of a first group of the identified user messages, to occur after expiration of a first time delay, at a contact center;
scheduling a response to each message of a second group of the identified user messages, to occur after expiration of a second time delay greater than the first time delay, at the contact center;
receiving, from the communication terminals, responses to the first group of the identified user messages and responses to the second group of the identified user messages;
transmitting the responses to the first group of the identified user messages after expiration of the first time delay;
transmitting the responses to the second group of the identified user messages after expiration of the second time delay;
determining if a loyalty transition boundary exists between groups of users receiving responses between expiration of the first and second time delays, respectively, wherein the loyalty transition boundary comprises a metric indicating a difference in aggregate user sentiment between two groups of users;
upon determining that the loyalty transition boundary exists,
presenting an indication of the loyalty transition boundary in correlation with the time delay for each of the two groups; and
if a loyalty transition boundary is not determined to exist, iteratively scheduling responses to messages of at least one additional group of identified user messages, to occur after expiration of a time delay incrementally greater than a preceding time delay until at least one loyalty transition boundary is detected.

10. The method according to claim 9, wherein scheduling responses to messages of the first and second groups of identified user messages comprises identifying messages of a first identifiable group.

11. The method according to claim 10, wherein the first identifiable group is a socio-demographic group identified by reference to at least one of respective user profiles, observable user social network messaging behavior, or a social network sentiment indicator derived from observable social network messaging activity.

12. The method according to claim 9, further comprising automatically generating and storing a user profile for at least some of the users, wherein each generated and stored user profile includes an indication of response time delay.

13. The method according to claim 12, wherein each user profile further includes at least one of a socio-demographic or a relationship status identifier.

14. The method according to claim 12, wherein each user profile further includes at least one of
an indication of a user's sentiment toward the entity at one or more points in time;
an indication of a user's sentiment toward a competitor of the entity at one or more points in time; or
an indication of a user's sentiment toward a particular product or service offered by the entity or a competitor of the entity at one or more points in time,
wherein each indication of user sentiment is derived from the monitored social network messaging activity.

15. The method according to claim 14, wherein determining existence of a loyalty transition boundary comprises
evaluating the user profiles of users of the first group to compute a first aggregate sentiment score;
evaluating the user profiles of users of the second group to compute a second aggregate sentiment score; and
detecting a statistically significant difference, between the first aggregate sentiment score and the second aggregate sentiment score.

16. The method according to claim 9, wherein the loyalty transition boundary corresponds to a time beyond which sentiment shifts in a direction that is at least one of:
away from the entity;
toward a competitor of the entity;
away from a product or service offered by the entity; or
toward a product or service offered by a competitor of the entity.

17. The method according to claim 16, further comprising:
selecting a loyalty transition boundary from the detected at least one loyalty transition boundary;
identifying a social network message, outside of the first, second or at least one additional group of identified user messages, relating to at least one of the entity or a product or service furnished by the entity; and
forwarding the identified social network message to a communication terminal of a contact center agent for response prior to crossing of the selected loyalty transition boundary.

18. A computer implemented method, comprising
in a server, monitoring social network messaging activity to identify user messages relating to at least one of an entity or a product or service associated with the entity;
forwarding the identified user messages to respective communication terminals of contact center agents assigned to respond to the identified user messages;
receiving, from the communication terminals, responses to the identified user messages;
transmitting the responses to a first group of users after elapsing of a first time period;
transmitting the responses to a second group of users after elapsing of a second time period greater than the first time period;
selecting a loyalty transition boundary, the loyalty transition boundary being a metric identified by detecting a difference in aggregate user sentiment between the first group of users receiving a response delayed by the first time period and the second group of users receiving a response delayed by the second time period;
upon selecting the loyalty transition boundary
presenting an indication of the loyalty transition boundary in correlation with the time delay for each of the two groups.

19. The method according to claim 18, further comprising forwarding the identified social network message to a communication terminal of a contact center agent for response prior to crossing of the selected loyalty transition boundary.

20. The method according to claim 18, wherein the loyalty transition boundary corresponds to a time beyond which sentiment shifts in a direction that is at least one of:
  away from the entity;
  toward a competitor of the entity;
  away from a product or service offered by the entity; or
  toward a product or service offered by a competitor of the entity.

21. The method according to claim 18, wherein selecting a loyalty transition boundary includes accessing a profile of an originator of the identified social network message, wherein the accessed profile includes at least one of an indication of the originator's sentiment toward the entity at one or more points in time;
  an indication of the originator's sentiment toward a competitor of the entity at one or more points in time; or
  an indication of the originator's sentiment toward a product or service offered by the entity or by a competitor of the entity at one or more points in time.

22. A system comprising:
  a contact center comprising at least one processor, a display, memory, and a network interface,
  wherein the contact center is configured to monitor at least one social network channel for messages from a user population and relating to at least one of an entity or a product or service of the entity, and
  wherein the contact center is further configured to forward at least some messages to respective communication terminals for corresponding agents to respond to the at least some messages,
  wherein the contact center is further configured to receive, from the communication terminals, responses to the messages; and
  a response time selection module comprising instructions, stored in the memory and executable by the at least one processor, for
  transmitting the responses to a first group of users after elapsing of a first time period;
  transmitting the responses to a second group of users after elapsing of a second time period greater than the first time period
  selecting a loyalty transition boundary comprising a metric identified by detecting a difference in aggregate user sentiment between the first group of users and the second group of users; and
  upon selecting the loyalty transition boundary,
    present an indication of the loyalty transition boundary in correlation with the first and second time periods for the two groups.

23. The system according to claim 22, further comprising a loyalty transition boundary detection module comprising instructions, stored in the memory and executable by the at least one processor, for
  Scheduling a response to each message of a first group of user messages, to occur after expiration of a first time period;
  scheduling a response to each message of a second group of user messages, to occur after expiration of a second time period; and
  determining if the loyalty transition boundary exists between groups of users receiving responses to the first and second groups of user messages, respectively.

24. The system according to claim 23, wherein the loyalty transition detection module further comprises instructions stored in the memory and executable by the at least one processor for
  if a loyalty transition boundary is not determined to exist between respective groups of users receiving responses to the first and second groups of user messages,
  iteratively scheduling responses to messages of at least one additional group of identified user messages, to occur after expiration of a time delay incrementally greater than a preceding time delay until at least one loyalty transition boundary is detected.

25. The system according to claim 23, wherein the instructions for determining include instructions for
  evaluating user profiles of users of the first group to compute a first aggregate sentiment score;
  evaluating user profiles of users of the second group to compute a second aggregate sentiment score; and
  detecting a statistically significant difference, between the first aggregate sentiment score and the second aggregate sentiment score.

26. The system according to claim 23, wherein the loyalty transition detection module further comprises instructions stored in the memory and executable by the at least one processor for
  subdividing the user population into N groups, where N is an integer greater than one; and
  scheduling respective responses to corresponding identified user messages of the user population according to group, wherein responses to user messages of any group are delayed by a time delay different than those of each of the other groups.

* * * * *

UNITED STATES PATENT AND TRADEMARK OFFICE
CERTIFICATE OF CORRECTION

PATENT NO. : 11,388,131 B2
APPLICATION NO. : 14/586691
DATED : July 12, 2022
INVENTOR(S) : Reinhard Klemm and Valentine Matula Page 1 of 1

It is certified that error appears in the above-identified patent and that said Letters Patent is hereby corrected as shown below:

In the Claims

Column 22, Claim 18, Line 57: delete "boundary" and insert --boundary,--

Signed and Sealed this
Sixth Day of December, 2022

Katherine Kelly Vidal
*Director of the United States Patent and Trademark Office*